United States Patent
Charpentier et al.

(10) Patent No.: US 6,311,073 B1
(45) Date of Patent: Oct. 30, 2001

(54) SYSTEM FOR CONNECTING A TELEPHONE SWITCH TO A FIXED TELEPHONE NETWORK VIA A PLURALITY OF FIXED RADIOTELEPHONE TERMINALS

(75) Inventors: Jean Charpentier, Viroflay; Edouard Issenmann, Le Chesnay, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/236,115

(22) Filed: Jan. 25, 1999

(30) Foreign Application Priority Data

Jan. 26, 1998 (FR) .................................. 98 00768

(51) Int. Cl.⁷ .................................. H04B 1/38
(52) U.S. Cl. .................. 455/560; 455/426; 455/445; 455/554; 455/555
(58) Field of Search .................. 455/417, 435, 455/426, 422, 414, 445, 462, 465, 552, 554, 555, 517, 560; 379/411, 412, 229, 167

(56) References Cited

U.S. PATENT DOCUMENTS

| | | | |
|---|---|---|---|
| 4,814,763 | * | 3/1989 | Nelson et al. ............... 455/417 |
| 5,400,390 | * | 3/1995 | Salin ........................... 455/417 |
| 5,544,227 | | 8/1996 | Blust et al. . |
| 5,596,624 | | 1/1997 | Armbruster et al. . |
| 5,793,859 | * | 8/1998 | Matthews .................. 455/417 |
| 5,818,919 | * | 10/1998 | Berberich, Jr. et al. ..... 379/211 |
| 5,887,256 | * | 3/1999 | Lu et al. ..................... 455/435 |
| 5,896,448 | * | 4/1999 | Holt ............................ 379/211 |
| 5,966,432 | * | 10/1999 | Buckler et al. .............. 379/211 |

FOREIGN PATENT DOCUMENTS

WO 95/29565   11/1995   (WO).
WO 96/24225   8/1996   (WO).

* cited by examiner

Primary Examiner—Doris H. To
(74) Attorney, Agent, or Firm—Sughrue, Mion, Zinn, Macpeak & Seas, PLLC

(57) ABSTRACT

A system includes: a plurality of fixed radiotelephone terminals connected to a telephone switch serving user terminals; call forwarding circuitry for forwarding a call addressed to one of the user terminals to a mobile service switching center managing the radiotelephone terminals, and providing access to the called user terminal, the forwarded call containing the identity of the called user terminal and containing the identity of the fixed radiotelephone terminal that is the first available in a list of radiotelephone terminals associated with the identity of the called user terminal; and, circuitry situated in the switching center to forward the call to a second fixed radiotelephone terminal designated by its international mobile subscriber identity number if the first terminal is busy. If the second terminal is busy, the switching center forwards the call to a third fixed radiotelephone terminal designated by its international mobile subscriber identity number. The system continues until a non-busy terminal can be used, while making use of a home location register only once. The switching center supplies the identity of the called user terminal to the radiotelephone terminal being used. The system is suitable for extending the public telephone network to isolated communities.

5 Claims, 3 Drawing Sheets

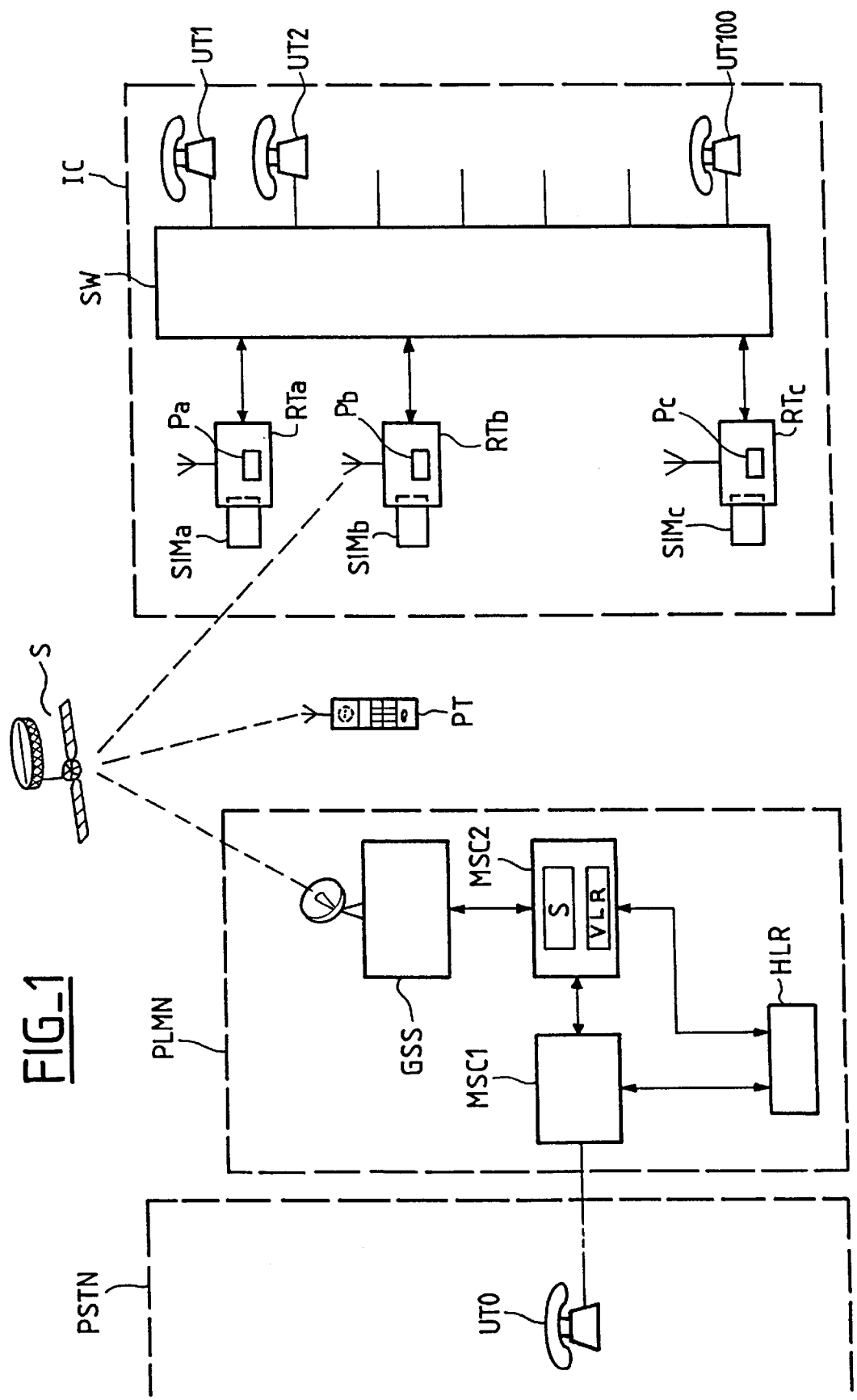

FIG 2    PRIOR ART

| Message | Parameters | PSTN | MSC1 | HLR | MSC2 | UT |
|---|---|---|---|---|---|---|
| IAM | Called = MSISDN 1 | 21 → | | | | |
| SRI invoke | Called = MSISDN 1 | | 22 → | | | |
| SRI result | Forward-to nbr = MSISDN a | | ← 23 | | | |
| IAM | Called = MSISDN a<br>Original called = MSISDN 1 | | 24 ↩ | | | |
| SRI invoke | Called = MSISDN a | | 25 → | | | |
| PRN invoke | Called = MSISDN a | | | 26 → | | |
| PRN result | MSRN = MSRN a | | | ← 27 | | |
| SRI result | MSRN = MSRN a | | ← 28 | | | |
| IAM | Called = MSRN a<br>Original called = MSISDN 1 | | 29 → | | | |
| IAM | Called = MSISDN b | | | | 30 ↩ | |
| SRI invoke | Called = MSISDN b | | | ← 31 | | |
| PRN invoke | Called = MSISDN b | | | 32 → | | |
| PRN result | MSRN = MSRN b | | | ← 33 | | |
| SRI result | MSRN = MSRN b | | | 34 → | | |
| IAM | Called = MSISDN c | | | | 35 ↩ | |
| SRI invoke | Called = MSISDN c | | | ← 36 | | |
| PRN invoke | Called = MSISDN c | | | 37 → | | |
| PRN result | MSRN = MSRN c | | | ← 38 | | |
| SRI result | MSRN = MSRN c | | | 39 → | | |
| PAGING | | | | | 40 ↔ | |
| AUTHENT | | | | | 41 ↔ | |
| SETUP | Called = MSISDN c | | | | 42 → | |

FIG 3

| Message | Paramètres | PSTN | MSC1 | HLR | MSC2 | UT |
|---|---|---|---|---|---|---|
| IAM | Called = MSISDN 1 | 51 → | | | | |
| SRI invoke | Called = MSISDN 1 | | 52 → | | | |
| SRI result | Forward-to nbr = MSISDN a | | ← 53 | | | |
| IAM | Called = MSISDN a<br>Original called = MSISDN 1 | | 54 ⇆ | | | |
| SRI invoke | Called = MSISDN a | | 55 → | | | |
| PRN invoke | Called = MSISDN a | | | 56 → | | |
| PRN result | MSRN = MSRN a | | | ← 57 | | |
| SRI result | MSRN = MSRN a | | ← 58 | | | |
| IAM | Called = MSRN a<br>Original called = MSISDN 1 | | 59 → | | | |
| | | | | | 60<br>(RT busy foward to IMSIb) | |
| | | | | | 61<br>(RT busy foward to IMSIc) | |
| PAGING | | | | | 62 ← → | |
| AUTHENTI. | | | | | 63 ← → | |
| SETUP | Called party = MSISDN 1 | | | | 64 → | |

SYSTEM FOR CONNECTING A TELEPHONE SWITCH TO A FIXED TELEPHONE NETWORK VIA A PLURALITY OF FIXED RADIOTELEPHONE TERMINALS

FIELD OF THE INVENTION

The invention relates to a system for connecting a telephone switch to a fixed telephone network via a radiotelephone network, a plurality of fixed radiotelephone terminals serving to replace a cable link. Each fixed radiotelephone terminal performs functions analogous to those of a conventional portable radiotelephone terminal, but it connects a small switch or exchange to the fixed telephone network, rather than connecting a single user thereto. The system of the invention can be used to connect to a public telephone network a small switch serving a hotel or a village situated in an isolated region where it would be too expensive to lay a cable. The switch serves a group of fixed user terminals by routing calls coming from the public network. Each fixed radiotelephone terminal is used in succession with different user terminals since the user terminals are not in permanent use. A plurality of radiotelephone terminals can share a common frequency band by using time division or code division.

BACKGROUND OF THE INVENTION

The invention relates more particularly to radiotelephone networks of the GSM type, and to those of types derived from the GSM type and which include a stationary satellite, or satellites in low earth orbit (LEO). GSM type networks have the following characteristics:

- a geographical zone subdivided into cells so as to enable carrier frequencies to be reused;
- a gateway manages the resources of each cell concerning carrier frequencies and the plurality of channels carried by each carrier frequency; and
- at least one switching center of the mobile radio service manages: calls, connections with the fixed telephone network, and databases, which databases contain the directory number, the international mobile subscriber number, and the location of each mobile subscriber.

Conventional GSM networks or networks derived therefrom are not designed to enable a plurality of subscribers to use the same user terminal. The user personalizes the terminal being used by inserting a subscriber identification module (SIM) card therein containing the international mobile subscriber identity (IMSI) which determines the account to which calls will be billed. After an initialization stage, the terminal is specified in radio messages by a temporary mobile subscriber identity (TMSI) which serves to protect the user's anonymity. In addition, an authentication procedure uses a secret key contained in the SIM card to prevent a user making fraudulent use of the IMSI or the TMSI of another user, whenever a call is made or received.

The use of a plurality of fixed radiotelephone terminals to connect a single switch to a GSM network poses a problem of coordinating the terminals, and also a problem of supplying the switch with the identity of a called line.

OBJECT AND SUMMARY OF THE INVENTION

The object of the invention is to propose a simple system for solving this problem.

The invention provides a system for connecting a telephone switch to a fixed telephone network via a radiotelephone network; the system including a plurality of fixed radiotelephone terminals for connecting the switch to the radiotelephone network, and a plurality of user terminals connected to said telephone switch, the system comprising:

call forwarding means for forwarding a call addressed to one of the user terminals and containing the directory number of the called user terminal to a mobile service switching center providing access to the called user terminal, the forwarded call containing a directory number designating a first fixed radiotelephone terminal associated with the directory number of the called user terminal; and means situated in said center to act as follows:
- if said first terminal is busy, to forward said call to a second fixed radiotelephone terminal designated by its international mobile subscriber identity number, said number being associated with the directory number of the called user terminal in the visitor location register associated with said center; and
- if said second terminal is busy, to forward said call to a third fixed radiotelephone terminal designated by its international mobile subscriber identity number, said number being associated with the directory number of the called user terminal in the visitor location register associated with said center; etc. . . . , until an available fixed radiotelephone terminal is found, if any.

The system characterized in this way coordinates use of fixed radiotelephone terminals since it calls only one radiotelephone terminal at a time. It forwards a call to each of the terminals in succession until it finds a terminal that is available, however it does not perform conventional forwarding to another directory number. If the first terminal tried is not free, then the switch conditionally forwards the call to another terminal by specifying that terminal by means of its IMSI as obtained by interrogating a visitor location register (VLR) and without interrogating a home location register (HLR) on each occasion as it would if it were performing a conventional call forwarding operation. This is possible because in this application the radiotelephone terminals are fixed so they therefore always depend from the same VLR.

The conventional procedure of interrogating the HLR for each conventional call forwarding operation is very expensive in processing time. The system of the invention thus makes it possible to economize processing time in the HLR, in the VLR, and in the switching center, on each attempt.

In a preferred embodiment, the call forwarding means for forwarding a call addressed to one of the user terminals include means for sending to the mobile service switching center an IAM message containing the directory number of the called user terminal;

the mobile service switching center further including means for supplying said directory number to the radiotelephone terminal in a SETUP message; and each of said fixed radiotelephone terminals including means for extracting the directory number of the called user terminal from the SETUP message received for setting up each call, and means for sending said number to the switch in the form of a conventional signalling message.

The system characterized in this way makes it possible in simple manner to perform direct inward dialing (DID), with the switch being capable of behaving like a switch connected to a fixed network for performing direct inward dialing.

BRIEF DESCRIPTION OF THE DRAWINGS

The invention will be better understood and other characteristics will appear on reading the following description and from the accompanying figures:

FIG. 1 is a block diagram showing an example of a telecommunications network including the system of the invention;

FIG. 2 is a timing diagram showing a method of coordinating and optimizing the use of a plurality of fixed radiotelephone terminals, by using the conventional system for conditional call forwarding, in the example network shown in FIG. 1; and FIG. 3 is a timing diagram showing a method of coordinating and optimizing the use of a plurality of fixed radiotelephone terminals by using the system of the invention, in the example network shown in FIG. 1. This diagram also shows how the identity of the called user terminal is supplied to the radiotelephone terminal in use.

MORE DETAILED DESCRIPTION

FIG. 1 is a block diagram of an example of a public telecommunications network including the system of the invention for providing telephone service to a community IC situated in an isolated region. This isolated community IC is served by a small private exchange or switch SW to which one hundred conventional telephone terminals UT1, . . . , UT100 are connected, for example. The switch SW is connected to a national public switched telephone network (PSTN) via a pubic land mobile network (PLMN) of a type derived from the GSM type.

The PLMN includes a geostationary satellite or a plurality of LEO satellites, and its main function is to serve mobile radiotelephone terminals PT. A switching center for the mobile radio service, MSC2, is connected to a satellite S via a gateway subsystem GSS which maintains a radio link with the satellite S. The PLMN includes in particular two switching centers for the mobile radio service, MSC1 and MSC2, and a database known as the HLR.

The switch SW communicates with the satellite, for, example, by means of three fixed radiotelephone terminals RTa, RTb, and RTc. Each fixed radiotelephone terminal RTa, RTb, and RTc is connected by a conventional telephone cable to the switch SW and each includes a card reader in which there is inserted a respective SIM card SIM1, SIM2, or SIM3. Each fixed radiotelephone terminal RTa, RTb, and RTc has a respective processor P1, P2, or P3 provided with a program which defines the operation of the terminal. It operates in identical manner to a conventional radiotelephone terminal of GSM or GSM derivative type. A preferred embodiment consists in using a conventional radiotelephone terminal in fixed manner.

All of the user terminals UT1, . . . , UT100 correspond to respective subscriptions and benefit from unconditional call forwarding to the line which corresponds to radiotelephone terminal RTa which is the first in the list of radiotelephone terminals RTa, RTb, RTc that can be used for routing a call to the user terminals UT1, . . . , UT100. If these subscriptions are of the "mobile subscriber" type, then each of the terminals UT1, . . . , UT100 has its own IMSI (but no SIM card since that would be pointless for a subscriber who does not move). If the subscriptions are of the "fixed subscriber" type, then each of the terminals UT1, . . . , UT100 has a conventional directory number.

The direct inward dialing (DID) function is performed using a method which requires modification to the software of the computer controlling the switching center MSC2 serving the radiotelephone terminals RTa, RTb, and RTc. When a call is set up, the center MSC2 sends a SETUP message which instead of containing the mobile station ISDN directory number (MSISDNa/b/c) of the fixed radiotelephone terminal RTa, RTb, or RTc, contains in accordance with the GSM standards:

either the MSISDN directory number of the called user terminal, if its subscription is of the "mobile subscriber" type;

or else its conventional directory number if its subscription is of the "fixed subscriber" type.

The terminal RTa, RTb, or RTc over which a call is routed forwards the directory number to the switch SW so as to enable it to select the user terminal which is being called. The software in each terminal RTa, RTb, and RTc is modified to extract the directory number of the called user terminal UT1, . . . , UT100 from the SETUP message received for setting up each call; and it is also modified to send this number to the switch SW in the form of conventional signalling messages, so as to enable the switch to select the called user terminal.

FIG. 2 is a timing diagram showing a method of coordinating and optimizing use of a plurality of fixed radiotelephone terminals using a conventional system of conditional call forwarding, in the example of the network shown in FIG. 1. This method consists in forwarding a call successively to each of the radiotelephone terminals RTa, RTb, and RTc until a terminal is found that is available. The system for conditionally forwarding a call addressed to a radiotelephone terminal is essentially constituted by a program executed by a computer controlling the mobile service switch MSC2 serving the fixed radiotelephone terminals RTa, RTb, and RTc. The conventional system forwards the call to an MSISDN directory number as supplied by the home location register HLR. The various steps performed are as follows:

21) A user of the fixed PSTN picks up the handset of a terminal UT0 and dials the directory number of terminal UT1 situated in the isolated community IC. Since the directory number is a public land mobile network (PLMN) number the parent exchange (not shown) of the terminal UT0 sends an initial address messuage (IAM) to a switching center MSC1 of the mobile radio service requesting that a call be set up between the terminal UT1 and the terminal UT0, with the terminal UT1 being designated by its directory number MSISDN1. The center MSC1 acts merely as an access point to the PLMN for the terminal UT0.

22) The center MSC1 sends a send routing information (SRI) request to the home location register HLR of the PLMN.

23) The HLR replies to the center MSC1 with a message instructing it to route the call to radiotelephone terminal RTa, with the terminal being specified by its directory number MSISDNa.

24) The center MSC1 then forwards the call by sending itself an IAM requesting that a call be set up with radiotelephone terminal RTa, which it identifies by means of its directory number MSISDNa. The center also places the directory number MSISDN1 designating the called terminal UT1 in an "ORIGINAL CALLED NUMBER" field of the message so as to make direct inward dialing possible for the call in the switch SW.

25) The center MSC1 thus sends the HLR a message referenced "SRI invoke" requesting routing information.

26) The HLR then sends a message requesting a roaming number to the mobile service switching center MSC2 since that is the center serving the terminal whose directory number is MSISDNa.

27) The center MSC2 replies to the HLR with a message referenced "PRN result" containing a roaming number MSRNa corresponding to the directory number MSISDNa. This roaming number enables a telephone call to be set up with the terminal RTa.

28) The HLR sends a message referenced "SRI result" containing routing information constituted by the roaming number MSRNa.
29) The center MSC1 then sends an IAM requesting an initial address to the center MSC2, this message containing the roaming number MSRNa and the initially called number MSISDN1.
30) The center MSC2 observes that the radiotelephone terminal RTa which is to be called is busy. It therefore preforms a conventional conditional forwarding operation to the directory number of radiotelephone terminal RTb.
31) It sends a "send routing information" message to the HLR, said message containing the directory number of radiotelephone terminal RTb.
32) The HLR sends to the center MSC2, a message requesting a roaming number corresponding to the directory number MSISDNb of radiotelephone terminal RTb.
33) The VLR in the center MSC2 replies to the HLR with a message containing the roaming number MSRNb corresponding to the directory number of radiotelephone terminal RTb.
34) The HLR sends to the center MSC2, a message containing routing information corresponding to the roaming number MSRNb.
35) The center MSC2 observes that radiotelephone terminal RTb which is to be called is busy. It therefore performs a conventional conditional call forwarding operation to the directory number of radiotelephone terminal RTc.
36) It sends a "send routing information" message to the HLR, said message containing the directory number of radiotelephone terminal RTc.
37) The HLR sends to the center MSC2, a message requesting a roaming number MSRNc corresponding to the directory number MSISDNc of radiotelephone terminal RTc.
38) The VLR of center MSC2 replies to the HLR with a message containing the roaming number MSRNc corresponding to the directory number of radiotelephone terminal RTc.
39) The HLR sends to the center MSC2 a message containing routing information corresponding to the roaming number MSRNc.
40) The center MSC2 pages the terminal RTc.
41) The center MSC2 authenticates the terminal RTc.
42) The center MSC2 establishes a telephone call with the user terminal UT1 by sending it a SETUP message.

It should be observed that the center MSC2 does not know how to give the radiotelephone terminal used the identity of the user terminal which is being called.

If the subscriptions of the terminals UT1, . . . . , UT100 are of the "fixed subscriber" type and depend on a local switch of the conventional PSTN, the above-described functions performed by the center MSC2 are performed instead by the local switching center of the conventional PSTN.

FIG. 3 is a timing diagram showing a method of coordinating and optimizing use of a plurality of fixed radiotelephone terminals by using the system of the invention in the example network shown in FIG. 1. As before, this method consists in forwarding a call successively to each of the radiotelephone terminals RTa, RTb, and RTc in a predetermined list until a terminal is found that is available. However, if the first terminal RTa in the list is busy, the conventional conditional call forwarding system is not used. To forward the call to the second terminal RTb of the list, the system of the invention forwards said call to an international mobile subscriber identity number IMSIb specifying said second radiotelephone terminal RTb, which number is supplied by the VLR. The system of the invention is preferably constituted essentially by a program executed by a computer controlling the mobile service switch MSC2 which serves the fixed radiotelephone terminals RTa, RTb, and RTc. In the example under consideration, the various steps performed are as follows:

51) A user of the fixed PSTN picks up the handset of a terminal UT0 and dials the directory number of terminal UT1 situated in the isolated community IC. Since the directory number is a public land mobile network (PLMN) number the parent exchange (not shown) of the terminal UT0 sends an initial address messuage (IAM) to a switching center MSC1 of the mobile radio service requesting that a call be set up between the terminal UT1 and the terminal UT0, with the terminal UT1 being designated by its directory number MSISDN1. The center MSC1 acts merely as an access point to the PLMN for the terminal UT0.
52) The center MSC1 sends a send routing information (SRI) request to the home location register HLR of the PLMN.
53) The HLR replies to the center MSC1 with a message instructing it to route the call to radiotelephone terminal RTa, with the terminal being specified by its directory number MSISDNa.
54) The center MSC1 then forwards the call by sending itself an IAM requesting that a call be set up with radiotelephone terminal RTa, which it identifies by means of its directory number MSISDNa. The center also places the directory number MSISDN1 designating the called terminal UT1 in an "ORIGINAL CALLED NUMBER" field of the message so as to make direct inward dialing possible for the call in the switch SW.
55) The center MSC1 thus sends the HLR a message referenced "SRI invoke" requesting routing information.
56) The HLR then sends a message requesting a roaming number to the mobile service switching center MSC2 since that is the center serving the terminal whose directory number is MSISDNa.
57) The center MSC2 replies to the HLR with a message referenced "PRN result" containing a roaming number MSRNa corresponding to the directory number MSISDNa. This roaming number enables a telephone call to be set up with the terminal RTa.
58) The HLR sends a message referenced "SRI result" containing routing information constituted by the roaming number MSRNa.
59) The center MSC1 then sends an IAM requesting an initial address to the center MSC2, this message containing the roaming number MSRNa and the initially called number MSISDN1.
60) In this example, the center MSC2 observed at the terminal RTa designated by the roaming number MSRNa is busy. In accordance with the invention, it forwards the call to number IMSIb without intervention from the HLR. It forwards to the terminal RTb since the number IMSIb is the first in a predetermined list: IMSIb, IMSIc, of international mobile subscriber identity numbers designating the terminals RTb and RTc capable of serving the called terminal UT1 when the terminal RTa is busy. This list corresponds to each of the directory numbers MSISDN1, ..., MSISDN100 of the terminals UT1, ..., UT100 in the VLR which is located in the center MSC2.

61) In this example, the center MSC2 observes that the terminal RTb as designated by the number IMSIb is also busy. In accordance with the invention, the center forwards the call to the number IMSIc without intervention from the HLR. It forwards onto the terminal RTc since the number IMSIc is the number following IMSIb in a predetermined list: IMSIb, IMSIc of international mobile subscriber identity numbers which designate the terminals RTb and RTc that can be used to serve the terminals UT1, ..., UT100 when the terminal RTa is busy.

62) In this example, the center MSC2 observes that the terminal RTc designated by the number IMSIc is free. It sends a paging message for terminal RTc.

63) The center MSC2 authenticates the terminal RTc.

64) The center MSC2 sends a SETUP message to the terminal RTc for use by the switch SW, this message containing the initially requested number MSISDN1. This number is used by the switch SW to set up a connection to the called terminal UT1.

If the subscriptions of the terminals UT1, ..., UT100 are of the "fixed subscriber" type and they depend from a local switch in the conventional pstn, then the functions described above as being performed by the center msc1 are performed by the local switching center of the conventional PSTN.

What is claimed is:

1. A system for connecting a telephone switch to a fixed telephone network via a radiotelephone network, the system including a plurality of fixed radiotelephone terminals connecting the switch to the radiotelephone network, and a plurality of user terminals connected to the switch, the system comprising:

call forwarding means for forwarding a call, addressed to a called one of the user terminals and containing a directory number of the called user terminal, to a mobile service switching center providing access to the called user terminal, the forwarded call containing a directory number designating a first one of said fixed radiotelephone terminals associated with the directory number of the called user terminal; and means situated in said center for operating as follows:

if said first terminal is busy, forwarding said call to a second one of said fixed radiotelephone terminals designated by its international mobile subscriber identity (IMSI) number, said IMSI number of the second terminal being associated with the directory number of the called user terminal in a visitor location register associated with said center; and if said second terminal is busy, forwarding said call to a third fixed radiotelephone terminal designated by its IMSI number, said IMSI number of the third terminal being associated with the directory number of the called user terminal in the visitor location register associated with said center;

if necessary, forwarding said call in like manner to a next IMSI number until an available one of said fixed radiotelephone terminals is found, if any.

2. A system according to claim 1, wherein the call forwarding means include means for sending to the mobile service switching center an IAM message containing the directory number of the called user terminal;

wherein the mobile service switching center further includes means for supplying said directory number to one of said fixed radiotelephone terminals in a SETUP message; and wherein each of said fixed radiotelephone terminals includes means for extracting the directory number of the called user terminal from a SETUP message received for setting up each call, and means for sending said number to the switch in the form of a conventional signaling message.

3. A method of connecting a telephone switch to fixed telephone network via a radiotelephone network using a plurality of fixed radiotelephone terminals, a plurality of user terminals connected to said telephone switch, comprising the steps of:

forwarding a call, addressed to and containing a directory number of a called one of the user terminals, to a mobile service switching center providing access to the called user terminal, the forwarded call containing a directory number designating a first fixed one of the radiotelephone terminals associated with the directory number of the called user terminal;

if said first fixed radiotelephone terminal is busy, forwarding said call to a second fixed radiotelephone terminal designated by its international mobile subscriber identity (IMSI) number, said IMSI number of the second fixed radiotelephone terminal being associated with the directory number of the called user terminal in a visitor location register associated with said center; and if said second fixed radiotelephone terminal is busy, forwarding said call to a third fixed radiotelephone terminal designated by its IMSI number, said IMSI number of the third fixed radiotelephone terminal being associated with the directory number of the called user terminal in the visitor location register associated with said center;

if necessary, forwarding said call in like manner to a next IMSI number until an available one of the fixed radiotelephone terminals is found, if any.

4. A method according to claim 3, wherein the step of forwarding a call addressed to one of the user terminals include sending to the mobile service switching center an IAM message containing the directory number of the called user terminal;

wherein any of the steps of forwarding said call further includes supplying said directory number to the respective fixed radiotelephone terminal in a SETUP message; and wherein setting up each call by any of said fixed radiotelephone terminals includes extracting the directory number of the called user terminal from a received SETUP message and sending said number to the switch in the form of a conventional signaling message.

5. A method of connecting a telephone switch to a telephone network via a radiotelephone network that includes a plurality of fixed radiotelephone terminals, said telephone network having a home location register and a visitor location register, the method including a step of, if an attempt to setup a call by forwarding the call to one of said fixed terminals results in a busy state, forwarding the call to a next one of said fixed terminals that has its international mobile subscriber identity (IMSI) number listed in the visitor location register as associated with a user attached to said switch, without using the home location register, until a non-busy terminal of said plurality of fixed terminals can be used.

* * * * *